United States Patent [19]
Roos

[11] Patent Number: 5,293,325
[45] Date of Patent: Mar. 8, 1994

[54] APPARATUS AND METHOD FOR COMPENSATING A RADAR'S SENSITIVITY TIMING CONTROL CIRCUIT

[75] Inventor: Mark G. Roos, Shawnee, Kans.

[73] Assignee: AlliedSignal Inc., Morris Township, Morris County, N.J.

[21] Appl. No.: 797,511

[22] Filed: Nov. 22, 1991

[51] Int. Cl.$^5$ .............................................. G01R 17/02
[52] U.S. Cl. ........................... 364/571.01; 364/571.02; 364/571.04; 364/571.05; 364/569; 342/91; 342/92; 342/174; 342/205
[58] Field of Search ..................... 364/571.01, 571.02, 364/571.04–571.08, 569; 342/91, 92, 174, 205; 307/264, 494, 491, 493; 330/52, 193, 129

[56] References Cited

U.S. PATENT DOCUMENTS

| 3,613,023 | 10/1971 | Barrett, Jr. et al. | 342/205 |
|---|---|---|---|
| 3,725,913 | 4/1973 | Roehl et al. | 342/205 |
| 3,745,571 | 7/1973 | Chwastyk et al. | 342/205 |
| 3,921,173 | 11/1975 | Thomson | 342/174 |
| 3,950,750 | 4/1976 | Churchill et al. | 342/174 |
| 4,394,659 | 7/1983 | Gellekink | 342/174 |
| 4,571,590 | 2/1986 | Bennett | 342/92 |
| 4,680,588 | 7/1987 | Cantwell | 342/92 |
| 4,937,466 | 6/1990 | Osterkamp et al. | 307/264 |
| 4,994,811 | 2/1991 | Mareira | 342/205 |

FOREIGN PATENT DOCUMENTS 0247986 11/1986 Japan .................................. 342/205

Primary Examiner—Jack B. Harvey
Assistant Examiner—Hal D. Wachsman
Attorney, Agent, or Firm—Howard G. Massung

[57] ABSTRACT

The signal that controls the gain of a sensitivity timing control (STC) circuit is slimmed with a gain correction signal to compensate for gain variations introduced by items such as variations in the parameters of electronic components. A known test signal is injected into the STC circuit and the resulting output signal is measured. The amplitude of the gain correction signal is determined based on the difference between the desired output signal amplitude and the measured output signal amplitude.

14 Claims, 4 Drawing Sheets

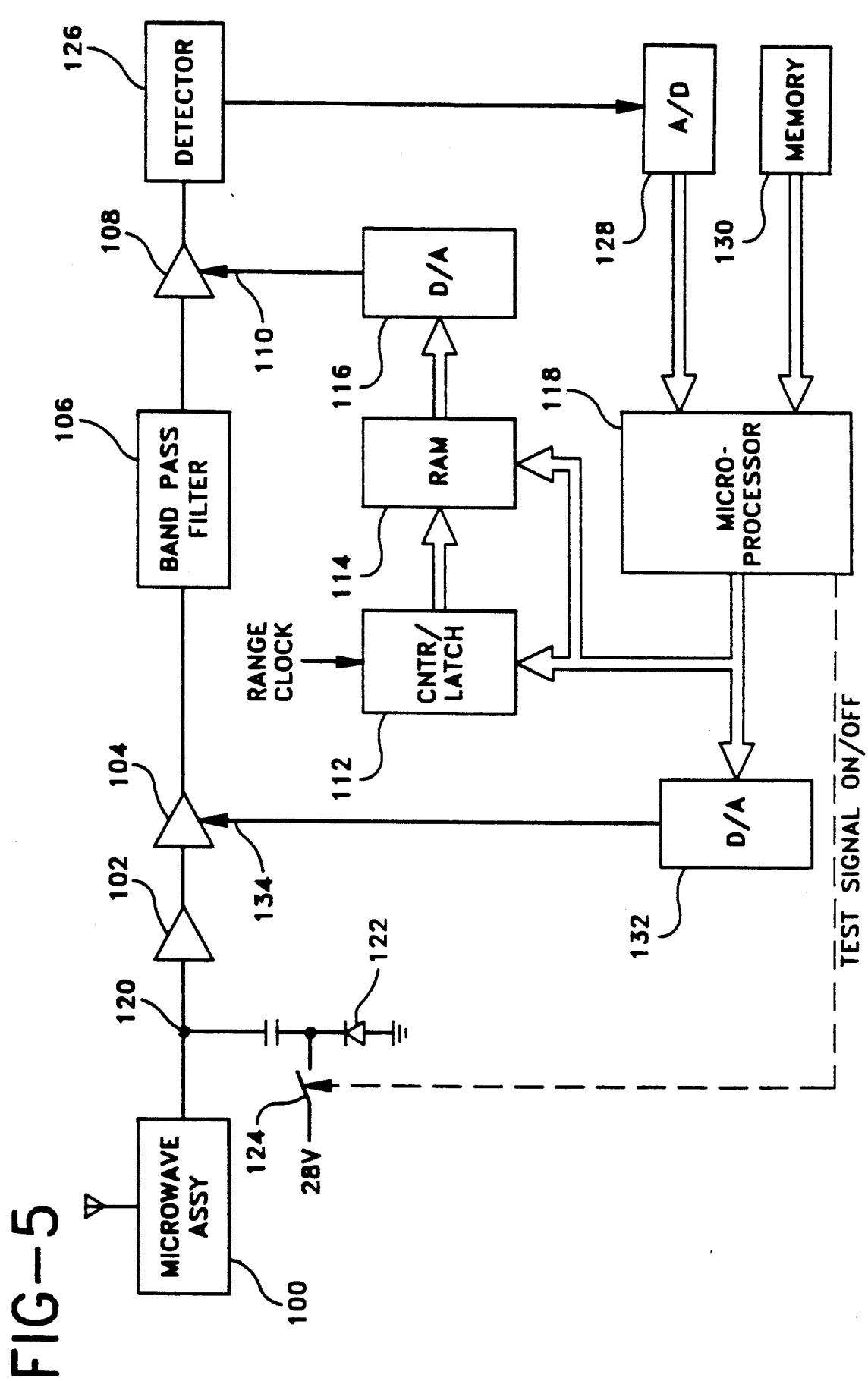

APPARATUS AND METHOD FOR COMPENSATING A RADAR'S SENSITIVITY TIMING CONTROL CIRCUIT

BACKGROUND OF THE INVENTION

1. Field of the Invention

The present invention relates to radars. More specifically it relates to a radar's sensitivity timing control circuit.

2. Description of the Related Art

A radar system operates by transmitting a pulse of radio frequency (RF) energy through the atmosphere to a target. The RF energy is reflected by the target and is received by the radar antenna. As the radar signal propagates through the atmosphere, it is attenuated. As a result, signals received from targets that are relatively close to the radar will be attenuated less than signals that are received from targets relatively far from the radar. To compensate for this attenuation, a sensitivity timing control (STC) circuit is used. The STC circuit feeds the received signal to amplifiers that have a gain which is varied over time. The circuit compensates for the atmospheric attenuation by providing less gain or amplification to signals received from targets that are close to the radar, and by providing more gain to signals received from targets that are relatively far from the radar.

The typical STC circuit includes amplifiers with variable gain. The amplifier which is used most widely in aviation electronics is the MC 1350 manufactured by Motorola. The 1350 performs well, but its parameters vary from part-to-part, from lot-to-lot and over temperature. In many radar systems, the gain introduced by the STC circuit is not controlled using a feedback control loop. This leaves the STC gain dependent on the variations in the amplifiers' parameters.

Radar systems with open loop STC circuits suffer from several problems. In the manufacture of the STC circuit, each circuit must be adjusted to compensate for the variations in the amplifiers that occur from device-to-device. In addition, once the unit is fielded, the gain of the STC circuit varies over temperature because there is no feedback control loop to compensation for the variations introduced by the amplifiers.

SUMMARY

The present invention comprises an apparatus for correcting the gain of a STC circuit. A test signal generation means applies an input test signal to the STC circuit so that an output test signal results. A computing means calculates an amplitude of a gain correction signal using the output signal. A summing means modifies the gain of the STC circuit using the gain correction signal.

The present invention uses a test time which is located between the time corresponding to a range beyond the maximum range of the radar and the time of the next transmission of RF energy. During that time, the gain of the amplifiers is measured so that a gain correction can be introduced to compensate for variations in the parameters of the amplifiers. By automatically measuring and compensating for these variations, it is no longer necessary to adjust each STC circuit during manufacturing, and the gain of the STC circuit is prevented from varying over temperature.

BRIEF DESCRIPTION OF THE DRAWINGS

FIG. 5 is a block diagram of another embodiment of an AGC circuit and STC circuit with gain compensation.

DESCRIPTION OF THE PREFERRED EMBODIMENTS

As a radar system operates, it transmits a pulse of RF energy and then receives signals reflected from targets for a predetermined amount of time. The time at which the radar stops receiving reflected signals corresponds to the maximum range of the radar. After the time that corresponds to the maximum range of the radar, a short amount of additional time is used for other functions before the next RF pulse is transmitted. The time from RF pulse transmission to the next RF pulse transmission is called the pulse repetition time (PRT). During each PRT, between the time that corresponds to maximum range and the next RF pulse transmission, the present invention performs measurements which are used to compensate the gain of the STC circuit.

In order to determine the gain of the STC amplifiers, an input signal of known amplitude is fed into the amplifiers, and then output signal is measured to determine its amplitude. The STC gain control signal which controls the gain of the STC circuit is also known at this time. Knowing the input signal amplitude, the gain setting, and the output signal amplitude provides a means to measure the gain of the STC circuit. If the measured gain varies from the desired gain, a gain correction signal is generated so that the resulting STC gain is at the desired level.

As mentioned earlier, the gain of the STC circuit is varied over time so that it can compensate for different amounts of atmospheric attenuation. Since the STC circuit has a variety of gain settings, it is preferable to test the STC circuit for each of the gain settings and to compare the resulting output with the desired output.

Figure 1:
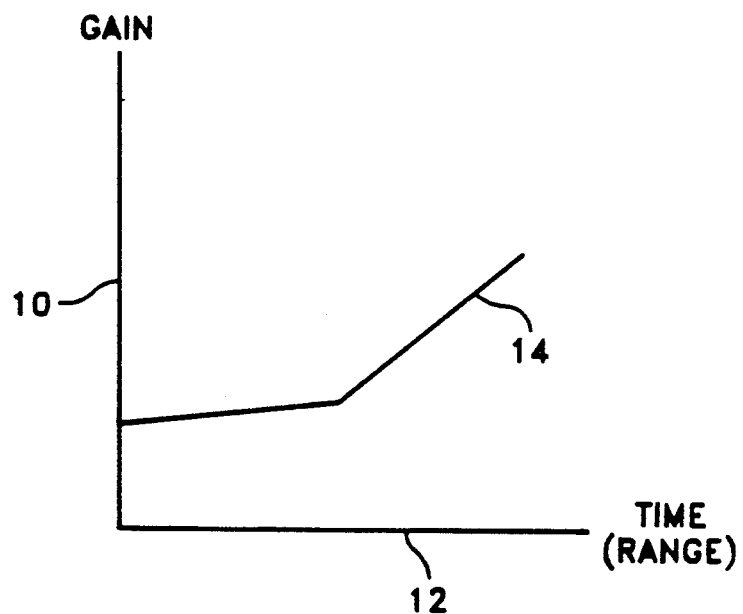
FIG. 1 illustrates an STC curve.

FIG. 1 illustrates an STC gain curve. Axis 10 indicates the gain of the STC circuit and axis 12 indicates the time after RF pulse transmission for a particular PRT. It should be noted that target range increases with the amount of time after RF pulse transmission. Curve 14 shows that the STC gain is increased with time or range. This increase in gain compensates for the increasing atmospheric attenuation that is encountered as range increases. Signals reflected by targets closer to the radar travel through less atmosphere, and therefore receive less attenuation and need less gain. Signals that are reflected by targets farther from the radar travel through more atmosphere, and therefore receive greater atmospheric attenuation and require greater gain.

Figure 2:
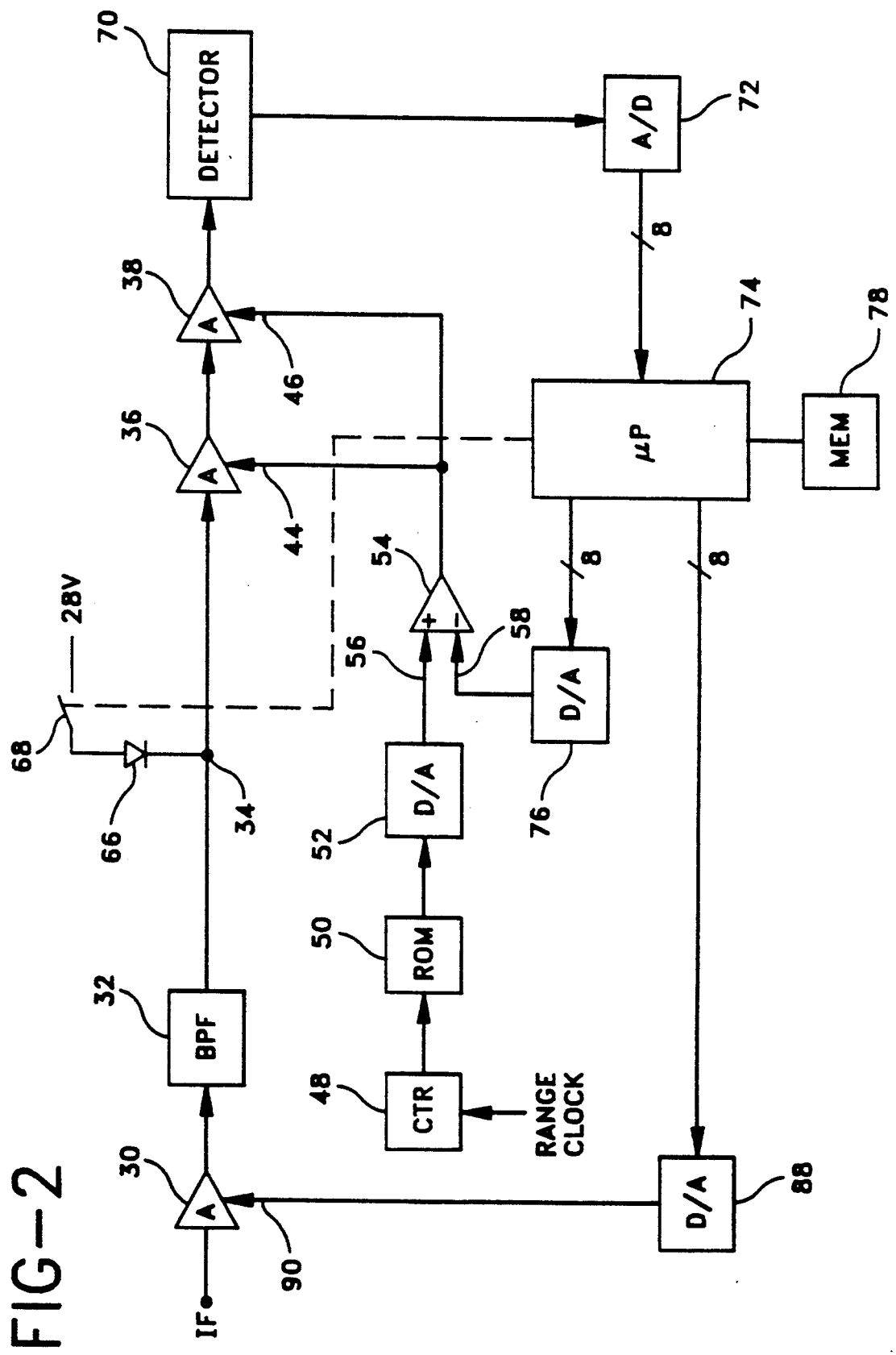
FIG. 2 is a block diagram of an AGC circuit and STC with gain compensation.

FIG. 2 is a block diagram of the present invention. In addition to an STC circuit which is compensated by the present invention, the figure also shows an automatic gain control circuit (AGC). An IF signal from the radar's receiver is fed into variable gain amplifier 30. This amplifier is used to provide the STC circuit with a signal that receives as much gain as possible without having so much gain that noise corrupts the system. The output from variable gain amplifier 30 is passed through band pass filter 32. Band pass filter 32 reduces the noise contained in the signal received by the STC circuit. For a system with an IF frequency of 60 MHZ, it is preferable to have a band pass filter of 1 MHz with a center frequency of 60 MHz. The output of band pass filter 32 is connected to point 34 which is also connected to the input of variable gain amplifier 36. The output of variable amplifier 36 is connected to the input of variable amplifier 38. The output of variable amplifier 38 constitutes the output of the STC circuit. It is preferable that amplifiers 30, 36 and 38 are MC 1350s.

Amplifiers 36 and 38 have gain control inputs 44 and 46 respectively. The signals to these gain control inputs are generated using counter 48, ROM 50 and digital to analog converter 52. Counter 48 begins counting after the RF pulse is transmitted and its outputs address locations within ROM 50. This results in different locations within ROM 50 being addressed as time and target range increase. ROM 50 is programmed with the desired gain settings for the STC circuit. Therefore, as range increases the different gain settings are produced at the output of ROM 50 to control the gain of the STC circuit. The output of ROM 50 is received by digital to analog converter 52. Digital to analog converter 52 converts the digital output of ROM 50 to a analog gain signal. The analog gain signal produced at the output of digital to analog converter 52 is received by amplifier 54. Amplifier 54 has a non-inverting input 56 and inverting input 58. Amplifier 54 sums the inverse of the signal on input 56 with the signal on input 58, and produces at its output a corrected gain signal which controls the gain of the STC circuit. The corrected gain signal is received by amplifier 36 on input 44, and by amplifier 38 on input 46.

The present invention injects a test signal into the STC circuit at point 34. This is done through the use of diode 66. Diode 66 is a calibrated noise diode which is extremely stable over temperature and time. It is preferable to use a diode manufactured by NOISE/COM, part number NC203, or a diode manufactured by Motorola, part number 1N4745A. Switch 68 is used to bias diode 66 so that it injects a test signal into the STC circuit when it is desirable to test the gain of the circuit.

When switch 68 is closed, diode 66 injects the test signal into the STC circuit at point 34. The input test signal passes through amplifiers 36 and 38 and is then received by detector 70. Detector 70 converts the output signal of amplifier 38 into a DC output signal. The DC signal from detector 70 is received by analog to digital converter 72. Analog to digital converter 72 converts the DC signal from detector 70 into a digital output signal which is received by microprocessor 74. Microprocessor 74 uses the signal received from analog to digital converter 72, and information stores in memory 78 to produce a digital gain correction signal. The digital gain correction signal from microprocessor 74 is received by digital to analog converter 76. Digital to analog converter 76 converts the digital gain correction signal into a gain correction signal. The gain correction signal is received by inverting input 58 of amplifier 54 where it is summed with an analog gain signal produced by digital to analog converter 52. The summation produces a corrected gain signal which controls the gain of the STC circuit.

Microprocessor 74 also controls the gain of the AGC circuit by controlling the gain of amplifier 30. This is accomplished through the use of digital to analog converter 88. Digital to analog converter 88 receives a digital word from microprocessor 74 and converts it into an analog signal which is fed to gain control input 90 of amplifier 30.

As mentioned earlier, the present invention tests the gain of the STC circuit during a time that occurs beyond the maximum range of the radar and before the next RF pulse transmission. To perform the test, microprocessor 74 sets the gain of the AGC circuit through digital to analog converter 88. The gain of the AGC circuit is set so that the probability of false alarm is 0.001% After setting the gain of the AGC circuit microprocessor 74 closes switch 68 which biases diode 66 so that a test signal is injected into the STC circuit at point 34. Detector 70 then receives the output from the STC circuit which is then converted to a digital word and received by microprocessor 74. Using this digital word, the desired gain values stored in memory 78 and the known amplitude of the input test signal, microprocessor 74 is able to determine the gain error of the STC circuit. Once the gain error is calculated, the microprocessor 74 produces the gain correction signal which is used to modify the analog gain signal produced by ROM 50 and digital analog converter 52.

Figure 3:
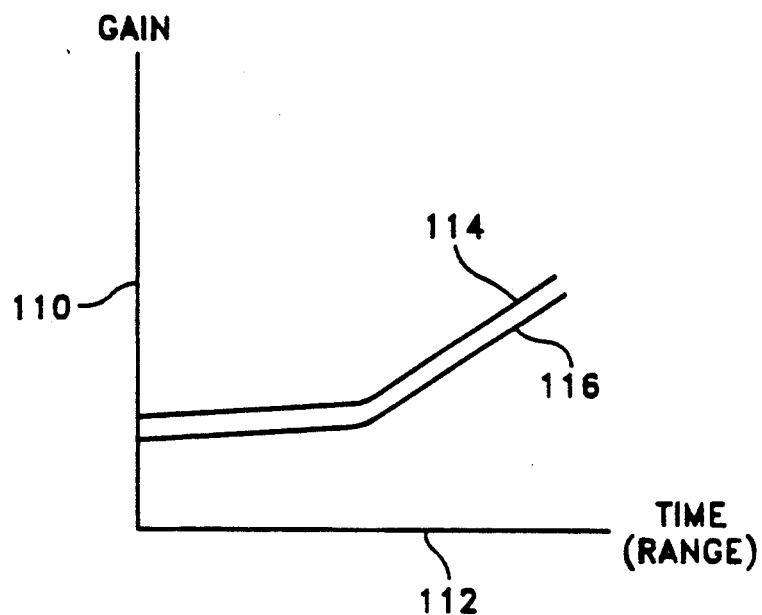
FIG. 3 illustrates a linear STC gain error.
Figure 4:
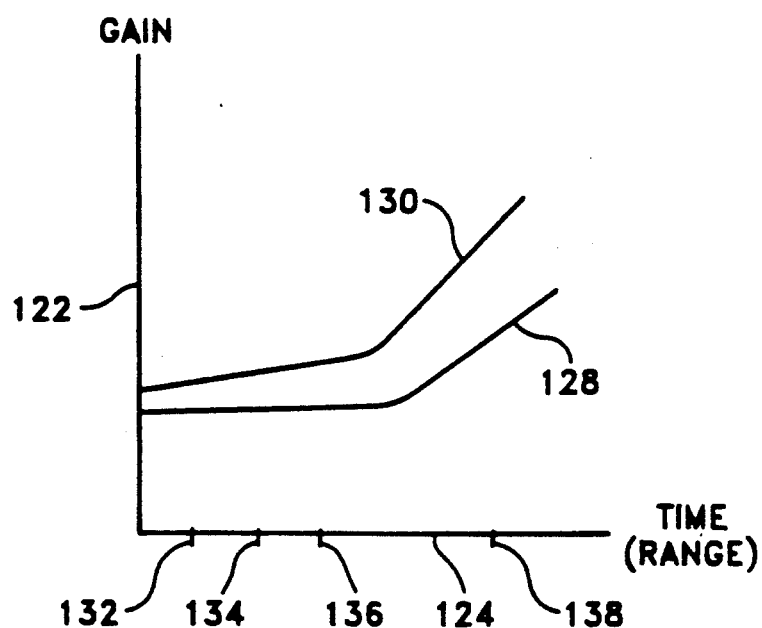
FIG. 4 illustrates a non-linear STC gain error.

The gain error of the STC circuit can be linear or non-linear. FIG. 3 illustrates a linear gain error and FIG. 4 illustrates a non-linear gain error. In FIG. 3 axis 110 shows gain and axis 112 illustrates time or range. Curve 114 illustrates the desired gain and curve 116 illustrates the gain measured by the present invention. It should be noted that in this case, the error is constant over time and can be characterized as linear.

Microprocessor 74 produces a digital gain correction signal using several methods. the first method involves measuring the difference between the desired STC output signal amplitude and the measured STC output signal amplitude. If the microprocessor detects an error, it modifies the present gain correction signal amplitude by an amount that will change the gain of the STC circuit so that the error is corrected.

In the second method, the microprocessor outputs a value of substantially zero to digital analog converter 76. With a zero amplitude gain correction signal, the microprocessor measure the difference between the STC output signal amplitude and the desired output signal amplitude, and then calculates a gain correction signal amplitude to produce the desired STC output signal. The newly calculated gain correction signal is fed to digital to analog converter 76.

The third method is similar to the second method except that microprocessor 74 stores a current gain correction signal amplitude. The newly calculated gain correction signal amplitude is averaged with the stored gain correction signal amplitude to produce an average gain correction signal which is then fed to digital to analog converter 76.

In the fourth method, the gain correction signal produced by microprocessor 74 is set to substantially zero, and then the difference between the STC output signal amplitude and the desired output signal amplitude is measured at 32 different points on the STC gain curve to produce 32 gain correction signal amplitudes. For example, the measurements are made for 32 different gain settings of the STC circuit. Microprocessor 74 can take measurements at different points on the STC curve by loading different values into counter 48. The number of measurements can be more or less than 32, but it is preferable to use 32 samples. The 32 gain correction signal amplitudes are summed and then divided by 32 to obtain an average gain correction signal amplitude. This newly calculated average gain correction signal amplitude is then added to the preceding 31 average gain correction signal amplitudes that were produced during the preceding 31 PRTs. This sum is then divided by 32 to produce a new overall average gain correction signal amplitude. The new overall average gain correction signal amplitude is then fed to digital to analog converter 76 to produce the desired signal at the output of the STC circuit. The equation below illustrates the calculations carried out by microprocessor 74.

$$D_{ave} = \frac{\sum_{k=1}^{n} \left( \frac{\sum_{i=1}^{m} D_j}{m} \right)_k}{n}$$

$D_{ave}$ is the average gain correction signal amplitude, $D_j$ is one of a plurality of gain correction signal amplitudes calculated during one PRT, m is the total number of gain correction signal amplitudes calculated during one PRT, and n is the total number of PRTs over which the average gain correction signal amplitude is calculated.

If microprocessor 74 detects a non-linear error, a slightly different method should be used. FIG. 4 illustrates a non-linear error. Axis 122 illustrates gain and axis 124 shows range or time. Curve 128 illustrates the desired gain over time and curve 130 illustrates the measured gain over time. At times 132, 143, 136 and 138, the spacing between curves 128 and 130 is different and thereby illustrates a non-linear error. In this case, microprocessor 74 calculates a gain correction signal amplitude for each of the times 132, 134, 136 and 138. Since there is a different gain correction signal for each sample time, microprocessor 74 monitors the radar range clock so that is can output the proper digital gain correction signal at the proper range or time. Each of these gain correction signal amplitudes is stored separately and is averaged with prior values corresponding to the same time periods in prior PRTs. For example, the gain correction signal amplitude calculated for time 132 must be averaged with a plurality of prior values calculated for time 132 during prior PRTs. A similar calculation is made for the other sample times. It is preferable to have 32 sample times and 31 prior values for each sample time. The following equation illustrates the calculation carried out by microprocessor 74 for each of the sample times.

$$G_{ave} = \frac{\sum_{i=1}^{m} D_j}{m}$$

$G_{ave}$ is the average gain correction signal amplitude for a particular sample time, $D_j$ is one of a plurality of gain correction signal amplitudes calculated for a particular sample time during prior PRTs, and m is the total number of PRTs over which the average gain correction signal amplitude is calculated.

FIG. 5 is a block diagram of another embodiment of the present invention. In addition to an STC circuit which is compensated by the present invention, the figure also shows an automatic gain control circuit (AGC). An IF signal from the radar's receiver/microwave assembly 100 is fed to preamplifier 102 and into variable gain AGC amplifier 104. Amplifier 104 is used to provide the STC circuit with a signal that receives as much gain as possible without having so much gain that noise corrupts the system. The output from variable gain amplifier 104 is passed through band pass filter 106. Band pass filter 106 reduces the noise contained in the signal received by the STC circuit. For a system with an IF frequency of 60 MHz, it is preferable to have a band pass filter of 1MHz with a center frequency of 60 MHz. The output of band pass filter 106 is connected to the input of variable gain STC amplifier 108. The output of STC amplifier 108 constitutes the output of the STC circuit. It is preferable that amplifiers 104 and 108 are MC 1350s.

Amplifier 108 has gain control input 110. The signal to gain control input 110 is generated using counter/latch 112, RAM 114 and digital to analog converter 116. Counter 112 begins counting after the RF pulse is transmitted and its outputs address locations within RAM 114. This results in different locations with RAM 114 being addressed as time and target range increase. RAM 114 is programmed with the desired gain settings for the STC circuit on power-up by microprocessor 118. Therefore, as range increases the different gain settings are produced at the output of RAM to control the gain of the STC circuit. The output of RAM 114 is received by digital to analog converter 116. Digital to analog converter 116 converts the digital output of RAM 114 to a analog gain signal. The analog gain signal produced at the output of digital to analog converter 116 is received by gain control input 110 of amplifier 108.

The present invention injects a test signal into the STC circuit at point 120. This is done through the use of diode 122. Diode 122 is a calibrated noise diode which is extremely stable over temperature and time. It is preferable to use a diode manufactured by NOISE/COM, part number NC203, or a diode manufactured by Motorola, part number 1N4745A. Switch 124 is used to bias diode 122 so that it injects a test signal into the STC circuit when it is desirable to test the gain of the circuit. When switch 124 is closed, diode 122 injects the test signal into the STC circuit at point 120. The input test signal passes through variable gain amplifiers 104 and 108 and is then received by detector 126. Detector 126 converts the output signal of amplifier 108 into a DC output signal. The DC signal from detector 126 is received by analog to digital (A/D) converter 128. Analog to digital converter 128 converts the DC signal from detector 128 into digital output signal which is received by microprocessor 118. Microprocessor 118 uses the signal received from analog to digital converter 128, and information stored in memory 130 to produce a digital gain correction value. The digital gain correction value is then used to correct the current digital gain value in RAM 114. The current value in RAM 114 is read by microprocessor 118, and then the digital gain correction value is summed with the current value to produce a digital gain value which is written into RAM 114. The new value is then fed to digital to analog converter 116 to produce an analog gain signal which is received by gain control input 110.

Microprocessor 118 also controls the gain of the AGC circuit by controlling the gain of amplifier 104. This is accomplished through the use of digital to analog converter 132. Digital to analog converter 132 receives a digital word from microprocessor 118 and converts it into an analog signal which is fed to gain control input 134 of amplifier 104.

As mentioned earlier, the present invention tests the gain of the STC circuit during a time that occurs beyond the maximum range of the radar and before the next RF pulse transmission. To perform the test, microprocessor 118 sets the gain of the AGC circuit through digital to analog convert 132. The gain of the AGC circuit is set so that the probability of false alarm is 0.001%. After setting the gain of the AGC circuit microprocessor 118 closes switch 124 which biases diode 122 so that a test signal is injected into the STC circuit at point 120. Detector 126 then receives the output from the STC circuit which is then converted to a digital word and received by microprocessor 118. Using this digital word, the desired gain values stored in memory 130 and the known amplitude of the input test signal, microprocessor 118 is able to determine the gain error of the STC circuit. Once the gain error is calculated, microprocessor 118 produces a digital gain correction value which is used to modify the analog gain signal produced by digital to analog converter 116.

Memory 130 contains two tables. Table 1 contains the initial STC curves which are loaded into RAM 114 upon power-up. This is a generic precalculated table of STC curves for all "typical" MC 1350's. Table 2 is an internal table which holds the desired output at the detector for a proper STC curve.

When the calibration cycle starts, microprocessor 118 recalls which location in RAM 114 it has tested last. Microprocessor 118 then tests the next location for calibration accuracy. Microprocessor 118 begins by addressing the test location in RAM 114. The value in that location is read by microprocessor 118 and is also received by digital to analog converter 116 where it is converted into a analog gain signal which is received by input 110 of STC amplifier 108.

The test signal from diode 122 is then turned on via switch 124. The noise is then amplified by the pre-amp 102 and AGC-AMP 104 and is then passed through band pass filter 106 to STC-AMP 108. STC-AMP 108 sends the amplified signal to detector 126. Detector 126 converts the 60 MHz signal to a DC value which is read by A/D converter 128. The digital value from the A/D converter 128 is read by microprocessor 118. Microprocessor 118 then compares this digital value to the desired value in table 2 which is contained in memory 130. If the two numbers are the same, there is no error and the value in RAM 114 remains the same. If the two values differ, then they are subtracted from each other. The difference between the two values is then used to produce a digital gain correction value that is used to correct the value that was read from the RAM 114 at the beginning of the test cycle. The difference value or the digital gain correction value can be averaged in either a linear or non-linear manner.

If the difference shows that the gain is too low, then the value in RAM 114 is incremented. If the difference shows that the gain is too high, then the value in RAM 114 is decremented. The new corrected gain value is then written back into the location being tested in RAM 114 so that it can be used during the next magnetron fire cycle.

One memory location is tested per magnetron fire cycle. If there are 128 memory locations in RAM 114, and if one magnetron fire occurs every 10 milliseconds, it will take 1.28 seconds to go through one complete calibration of the STC curve. If a value stored RAM 114 memory location produces a large error, then it may take several seconds to correct that location using a method of either incrementing or decrementing by 1. In order to increase the response time, the difference between the value from A/D converter 128 and table 2 can be used to increase or decrease the value stored in the memory location by an amount that is directly related to the difference.

Microprocessor 118 produces a digital gain correction value using several methods. One involves measuring the difference between the desired STC output signal amplitude and the measured STC output signal amplitude. If the microprocessor detects a difference, it modifies the current value in RAM 114 by an amount that will change the gain of the STC circuit so that the difference approaches zero.

In another method microprocessor 118 produces a digital gain correction value and then uses that value to produce a new digital gain value. The newly calculated digital gain value is averaged with the current digital gain value stored in RAM 114 to produce an average digital gain value which is then written to RAM 114.

In yet another method, microprocessor 118 measures the difference between the STC output signal amplitude and the desired output signal amplitude at 32 different points on the STC gain curve to produce 32 digital gain correction values. For example, the measurements are made for 32 different gain settings of the STC circuit. Microprocessor 118 can take measurements at different points on the STC curve by loading different values into counter/latch 112. The number of measurements can be more or less than 32, but it is preferable to use 32 samples. The 32 digital gain correction values are summed and then divided by 32 to obtain an average digital gain correction value. This newly calculated average digital gain correction value is then added to the preceding 31 average digital gain correction values that were produced during the preceding 31 PRTs or test periods. This sum is then divided by 32 to produce a new overall average digital gain correction value. Each digital gain value in RAM 114 is modified by summing it with the new overall average digital gain correction value. The equation below illustrates the calculations carried out by microprocessor 118.

$$V_{ave} = \frac{\sum_{k=1}^{n} \left( \frac{\sum_{j=1}^{m} V_j}{m} \right)_k}{n}$$

$V_{ave}$ is the average digital gain correction value, $V_j$ is one of a plurality of digital gain correction values calculated during one PRT, m is the total number of digital gain correction values calculated during one PRT, and n is the total number of PRTs over which the average digital gain correction value is calculated.

If microprocessor 118 detects a non-linear error, a slightly different method should be used. Referring back to FIG. 4, microprocessor 118 calculates a digital gain correction value for each of the times 132, 134, 136 and 138. Each of these digital gain correction values is averaged with prior values corresponding to the same time periods in prior PRTs. For example, the digital gain correction value calculated for time 132 must be averaged with a plurality of prior values calculated for time 132 during prior PRTs. A similar calculation is made for the other sample times. It is preferable to have 32 sample times and 31 prior values for each sample time. The following equation illustrates the calculation carried out by microprocessor 118 for each of the sample times.

$$V_{ave} = \frac{\sum_{j=1}^{m} V_j}{m}$$

$V_{ave}$ is the average digital gain correction value for a particular sample time, $V_j$ is one of a plurality of digital gain correction values calculated for a particular sample time during prior PRTs, and m is the total number of PRTs over which the average digital gain correction value is calculated.

I claim:

1. An apparatus for correcting a gain of a sensitivity timing control circuit, comprising:
   (a) test signal generation means for providing an input test signal to the sensitivity timing control circuit so that an output signal having a given amplitude results;
   (b) computing means for calculating an amplitude of a gain correction signal using said given output signal amplitude, wherein said computing means sets a present gain correction signal amplitude to a value of substantially zero, calculates a difference between a desired output signal amplitude and said given output signal amplitude, calculates a new gain correction signal amplitude, and averages a stored gain correction signal amplitude and said new gain correction signal amplitude to calculate said gain correction signal amplitude; and
   (c) summing means for modifying the gain of the sensitivity timing control circuit using said gain correction signal.

2. The apparatus of claim 1, wherein said computing means calculates an average gain correction signal amplitude using the equation $$D_{ave} = \frac{\sum_{k=1}^{n} \left( \frac{\sum_{j=1}^{m} D_j}{m} \right)_k}{n}$$

where $D_{ave}$ is said average gain correction signal amplitude, $D_j$ is one of a plurality of grain correction signal amplitudes calculated during one PRT (Pulse Repetition Time) m is a first number equal to the total number of gain correction signal amplitudes in said plurality of gain correction signal amplitudes, and n is a second number equal to the total number of PRTs over which said average gain correction signal amplitude is calculated.

3. The apparatus of claim 1, wherein said test signal generation means comprises a calibrated noise diode.

4. The apparatus of claim 1, further comprising detector means for converting said given amplitude output signal into a DC output signal.

5. The apparatus of claim 4, further comprising analog to digital converter means for converting said DC output signal into a digital output signal.

6. The apparatus of claim 5, further comprising digital to analog converter means for converting a digital gain correction signal into said gain correction signal.

7. The apparatus of claim 6, wherein said test signal generation means comprises a calibrated noise diode.

8. A sensitivity timing control circuit having gain compensation, comprising:
   (a) amplifier means for variably amplifying an input signal in response to a corrected gain signal;
   (b) memory means for storing a plurality of gain values;
   (c) first digital to analog converter means for converting a gain value into an analog gain signal;
   (d) test signal generation means for providing an input test signal to said amplifier means so that an output signal having a given amplitude results;
   (e) computing means for calculating an amplitude of a gain correction signal using said given output signal amplitude, wherein said computing means sets a present gain correction signal amplitude to a value of substantially zero, calculates a difference between a desired output signal amplitude and said given output signal amplitude, calculates a new gain correction signal amplitude, and averages a stored gain correction signal amplitude and said new gain correction signal amplitude to calculate said gain correction signal amplitude; and
   (f) summing means for summing said gain correction signal and said analog gain signal to produce said corrected gain signal.

9. The apparatus of claim 8, wherein said computing means calculates an average gain correction signal amplitude using the equation $$D_{ave} = \frac{\sum_{k=1}^{n} \left( \frac{\sum_{j=1}^{m} D_j}{m} \right)_k}{n}$$

where $D_{ave}$ is said average gain correction signal amplitude, $D_j$ is one of a plurality of grain correction signal amplitudes calculated during one PRT (Pulse Repetition Time), m is a first number equal to the total number of gain correction signal amplitudes in said plurality of gain correction signal amplitudes, and n is a second number equal to the total number of PRTs over which said average gain correction signal amplitude is calculated.

10. The apparatus of claim 8, wherein said test signal generation means comprises a calibrated noise diode.

11. The apparatus of claim 8, further comprising detector means for converting said given amplitude output signal into a DC output signal.

12. The apparatus of claim 11, further comprising analog to digital converter means for converting said DC output signal into a digital output signal.

13. The apparatus of claim 12, further comprising second digital to analog converter means for converting a digital gain correction signal into said gain correction signal.

14. A sensitivity timing control circuit having gain compensation, comprising:
   (a) amplifier means for variably amplifying an input signal in response to an analog gain signal;
   (b) memory means for storing a plurality of current digital gain values;
   (c) digital to analog converter means for converting a current digital gain value into an analog gain signal;
   (d) test signal generation means for providing an input test signal to said amplifier means so that an output signal having a given amplitude results, said test signal generation means having a calibrated noise diode;
(e) detector means for converting said output signal into a DC output signal;
(f) analog to digital converter means for converting said DC output signal into a digital output signal; and
(g) computing means for producing a new digital gain value by using said digital output signal to calculate a difference between said given output signal amplitude and a desired output signal amplitude to produce a digital gain correction value, and by summing said digital gain correction value and a current digital gain value.

* * * * *